Patented Oct. 2, 1934

1,975,087

UNITED STATES PATENT OFFICE 1,975,087

COMPOSITION OF MATTER

Harry B. Dykstra and Walter E. Lawson, Wilmington, Del., assignors to E. I. du Pont de Nemours & Company, Wilmington, Del., a corporation of Delaware No Drawing. Application September 27, 1929, Serial No. 395,739

27 Claims. (Cl. 260—2)

This invention relates to synthetic resins; more particularly to a synthetic resin having superior physical and chemical properties, and still more particularly to the production of such resins from vinyl chloroacetate in a process which replaces the chlorine therein with another group and leaves the product substantially dechlorinated.

Polymerized vinyl chloroacetate has certain serious faults as a constituent of surface finishes, largely because of the presence of a reactive chlorine atom in the chloroacetate molecule. Its films darken markedly on exposure to light and disintegrate when exposed to the weather. When coated over bare steel without any undercoat, the metal underneath the film rusts in a short time.

On the other hand, vinyl chloroacetate can be readily prepared in high yield and, when proper precautions are taken, can be easily polymerized to give a light colored resin. Any comparatively stable derivative of polymerized vinyl chloroacetate would, therefore, be particularly attractive, if it would retain the advantages of high vinyl ester yield and light color of resin and yet be free from the disturbing reactivity of the chlorine radical.

This invention has as an object the production of a stable, superior resin, the use of vinyl chloroacetate as the base in the production of such a resin, the elimination of the objectionable features heretofore found in the use of vinyl chloroacetate, and such other objects as will hereinafter appear.

These objects are accomplished by the following invention which, broadly speaking, consists in the treatment in a proper solvent of vinyl chloroacetate with reagents such as salts, and alcoholates. We have found that the best results are obtained by the use of the compounds named in the discussion below.

Vinyl chloroacetate will react with a variety of organic compounds to give products substantially free from chlorine and possessing advantages, from the standpoint of protective finishes, not exhibited by polymerized vinyl chloroacetate itself. Moreover, it will react with certain other compounds to give products which have valuable properties as constituents of molding compositions. For example, polymerized vinyl chloroacetate will react excellently with compounds of such varied types as the alkali metal salts of fatty acids, drying oil acids, and aromatic acids, alkali metal salts of phenols, such as potassium phenoxide, and with sodium alcoholates, such as sodium glycerylate. Polymerized vinyl chloroacetate reacts also with the mono- and disodium salts of dibasic acids but better results were obtained with the reagents previously listed.

Although the salts of dibasic acids are not in themselves particularly good as reagents, yet it has been found that the products of the reaction of vinyl chloroacetate with the sodium salts of the mono esters of phthalic acid are particularly excellent as constituents of protective finishes. The salts of esters of other dibasic acids are also valuable for this purpose.

The acetate of ethylene-glycol-monoethylether, butyl acetate and cyclohexyl acetate are useful solvents for this purpose. It is noted that cyclohexyl acetate is superior to butyl acetate, presumably because its higher boiling point results in a higher reaction temperature. Lower boiling, cheaper solvents for polymerized vinyl chloroacetate can also be used simply by conducting the reaction under such pressure as to permit a higher reaction temperature.

The process is carried on as follows: Vinyl chloroacetate is polymerized in any of the ways and by treatment with such processes as are shown and known in the prior art and is then reacted with the desired reagents in the manner generally described above and specifically illustrated in the examples below. It is found that it is much better to polymerize first and carry on the reaction later rather than to react the unpolymerized vinyl acetate first and then polymerize the product, because polymerized vinyl chloroacetate is much more stable than the unpolymerized ester and is decomposed but little in the reaction, particularly when reacting with the sodium salts of organic acids.

Examples illustrative of the preferred procedure are detailed below:

Example 1

A mixture of 120 g. polymerized vinyl chloroacetate, 244 g. sodium butyl phthalate, and 800 g. of the acetate of ethylene-glycol-monoethylether was heated with constant stirring for seven hours at 150° C. The reaction mixture was filtered and the solvent removed from the filtrate by vacuum distillation, giving 280 g. of light colored resin which contained 1.5 per cent chlorine. The resin was soluble in aromatic hydrocarbons, and compatible with pyroxylin, differing in this respect from polymerized vinyl chloroacetate, and its mixtures air-dried quickly to give hard and tough finishes. Films in which the resin was the sole film-forming constituent became hard when baked at 150° C. for approximately five hours.

The films were much more stable to light, to heat, and to water than films from vinyl chloroacetate resin.

Example 2

A mixture of 60 g. vinyl chloroacetate polymer, 108 g. sodium ethyl phthalate, and 400 g. of the acetate of ethylene-glycol-monoethyl-ether was refluxed for eight hours with constant stirring. On filtering the reaction mixture and evaporating the filtrate under diminished pressure, 130 g. of light brown resin was obtained. The resin resembled that described in Example 1 above, except that it gave hard films on baking two to three hours at 150° C.

Example 3

A mixture of 60 g. vinyl chloroacetate resin, 45 g. sodium acetate, and 200 g. butyl acetate was refluxed for 13 hours and then filtered. Analysis of the residue for chlorine indicated that 70 per cent of the chlorine had been removed from the vinyl resin. On removing the solvent from the filtrate a soft brown resin was obtained which was soluble in acetic acid and benzene, as well as in the polyvinyl chloroacetate solvents.

Example 4

A mixture of 40 g. polymerized vinyl chloroacetate, 114 g. sodium salts of linseed oil acids, 200 g. butyl acetate, and 5 g. acetic acid was refluxed for seven hours and then filtered. On evaporating the solvent from the filtrate under diminished pressure, 109 g. of soft brown resin was obtained. The resin was soluble in ethyl and butyl alcohols, and in benzene, none of which is a solvent for polyvinyl chloroacetate. Solutions of the resin gave soft films which became hard on baking.

Example 5

A mixture of 60 g. vinyl chloroacetate resin, 70 g. potassium phenoxide, and 150 g. of the acetate of ethylene-glycol-monoethyl-ether was refluxed for five hours. The bulk of the resinous reaction product was insoluble and separated from solution. The solvent was evaporated under diminished pressure and the sodium chloride removed by washing with water. The product contained some unchanged vinyl chloroacetate polymer and a resin which was insoluble in alcohols and esters and only slightly soluble in benzene. This resin finds application in the plastics industry.

The advantage of this procedure is that it is possible to prepare from vinyl chloroacetate or from its polymer, resins having solubilities and compatibilities which differ from those of vinyl chloroacetate polymers and also can be made to differ from each other, by the substitution of different groups for the chlorine atom. For example, it is possible to prepare resins from vinyl chloroacetate, or from its polymer, which are compatible with pyroxylin. Another advantage of this process is that the products resulting therefrom are substantially free from the disturbing reactivity of the chlorine radical. This serves to make them particularly desirable in coating compositions. It is to be observed, of course, that their use is not limited to coating compositions but includes a variety of arts such as the making of plastics.

It will be apparent that the invention is not limited to the specific examples of the specific process listed above, but that many changes could be made which will occur to persons skilled in the art, and which will not depart from the spirit of the invention. The invention, consequently, is not to be construed as limited except as by the appended claims.

We claim:

1. The process of making substantially chlorine-free synthetic resins comprising reacting vinyl chloroacetate with the alkali metal salt of an OH containing organic compound of the class consisting of alcohols, phenols, and carboxylic acids and polymerizing.

2. The process as in claim 1 in which the reaction takes place in a solvent for polymerized vinyl chloroacetate.

3. The process as in claim 1 in which the reaction takes place in a solvent for polymerized vinyl chloroacetate containing an organic acetate.

4. The step in the process of making a synthetic resin comprising reacting polymerized vinyl chloroacetate with an alkali metal salt of a compound from the class consisting of alcohols, phenols, and carboxylic acids.

5. The process of making substantially chlorine-free synthetic resins comprising the polymerization of vinyl chloroacetate and its reaction in solution with the alkali metal salt of a fatty acid.

6. The process defined in claim 5 in which the solvent is ethylene-glycol-monoethyl-ether.

7. The process defined in claim 5 in which the salt used is the sodium salt.

8. The process of making substantially chlorine-free synthetic resins comprising the polymerization of vinyl chloroacetate and its reaction in a solution with the alkali metal salt of a partially esterified carboxylic acid.

9. The process defined in claim 8 in which the salt is that of a mono ester of a dibasic acid.

10. The process defined in claim 8 in which the salt is the sodium salt of a mono ester of phthalic acid.

11. The process of dechlorinating polymerized vinyl chloroacetate consisting in reacting it with an alkali metal salt of a compound from the class consisting of alcohols, phenols, and carboxylic acids.

12. The process defined in claim 11 in which the salt used is the salt of a carboxylic acid.

13. The process of dechlorinating polymerized vinyl chloroacetate consisting in reacting it with the alkali metal salt of a mono ester of a dibasic acid.

14. The process of making a substantially chlorine-free synthetic resin consisting in reacting vinyl chloroacetate with the alkali metal salt of a mono ester of a dibasic acid, and polymerizing the resulting product.

15. The process of making substantially chlorine-free synthetic resins comprising reacting polymerized vinyl chloro acetate with an organic alkali metal salt of a compound of the class consisting of alcohols, phenols, and carboxylic acids.

16. A step in the process of making a vinyl resin which comprises reacting vinyl chloroacetate with an alkali metal salt of an organic acid.

17. A step in the process of making a synthetic resin which comprises reacting polymerized vinyl chloroacetate with an organic alkali metal salt.

18. The method of making a synthetic resin which comprises reacting vinyl chloroacetate with the alkali metal salt of an organic carboxylic acid and polymerizing the product.

19. A resinous compound comprising polyvinyl chloroacetate containing one of a group of organic radicals consisting of phenoxy, alkoxy, and acyloxy.

20. A resinous compound comprising polyvinyl chloroacetate containing a phenoxy radical.

21. A resinous compound comprising polyvinyl chloroacetate containing an alkoxy radical.

22. A resinous compound comprising polyvinyl chloroacetate containing an acyloxy radical.

23. A resinous compound comprising polyvinyl chloroacetate in which chlorine has been substituted by reaction with an alkali metal salt of a compound from the class consisting of alcohols, phenols, and carboxylic acids.

24. A resinous compound comprising polyvinyl chloroacetate in which chlorine has been substituted by reaction with an alkali metal salt of an alcohol.

25. A resinous compound comprising polyvinyl chloroacetate in which chlorine has been substituted by reaction with an alkali metal salt of a phenol.

26. A resinous compound comprising polyvinyl chloroacetate in which chlorine has been substituted by reaction with an alkali metal salt of a carboxylic acid.

27. A resinous compound comprising polyvinyl chloroacetate in which chlorine has been substituted by reaction with an alkali metal salt of a dicarboxylic acid.

HARRY B. DYKSTRA.
WALTER E. LAWSON.